United States Patent [19]
Cordara

[11] Patent Number: 4,742,729
[45] Date of Patent: May 10, 1988

[54] MOTION TRANSMITTING DEVICE BETWEEN TWO COAXIAL ROTATING MEMBERS

[75] Inventor: Oscar Cordara, Turin, Italy

[73] Assignee: U.T.A.S. S.p.A., Pianezza, Italy

[21] Appl. No.: 946,984

[22] Filed: Dec. 29, 1986

Related U.S. Application Data

[63] Continuation-in-part of Ser. No. 689,714, Jan. 8, 1985, abandoned.

[30] Foreign Application Priority Data

Jan. 10, 1984 [IT] Italy .................. 67015 A/84
Jan. 8, 1985 [EP] European Pat. Off. ........ 85730001.6
Jan. 10, 1985 [JP] Japan .................. 60-2601

[51] Int. Cl.$^4$ .................. F16H 33/00; F16H 1/28
[52] U.S. Cl. .................. 74/640; 74/800
[58] Field of Search .................. 74/640, 800, 411

[56] References Cited

U.S. PATENT DOCUMENTS

| | | | |
|---|---|---|---|
| 2,305,505 | 12/1942 | Wagner | 74/800 X |
| 2,849,897 | 9/1958 | Walma | 74/411 X |
| 3,187,605 | 6/1965 | Stiff | 74/640 |
| 3,363,484 | 1/1968 | Slaughter | 74/640 X |
| 3,525,890 | 8/1970 | Buchanan | 74/640 X |
| 3,532,005 | 10/1970 | Bremner et al. | 74/800 X |
| 3,550,476 | 12/1970 | Young | 74/800 X |
| 3,796,898 | 3/1974 | Kleinwaechter | 74/640 X |
| 3,977,275 | 8/1976 | Kiesewetter et al. | 74/640 X |
| 4,563,915 | 1/1986 | Tibbals | 74/800 |

FOREIGN PATENT DOCUMENTS

| | | | |
|---|---|---|---|
| 199610 | 9/1967 | U.S.S.R. | 74/640 |
| 684226 | 9/1979 | U.S.S.R. | 74/640 |
| 934083 | 6/1982 | U.S.S.R. | 74/800 |

Primary Examiner—Dirk Wright

[57] ABSTRACT

A motion reducing device, adapted to be attached to the frame of and driven by an electric motor, includes a rigid disk provided with a planar toothed ring portion which is meshed with a sector of a toothed ring portion of a flexible disk radially secured to the driven shaft. The pitch of the ring portion is slightly different from that of the planar toothed ring portion. The driving shaft is coaxial with the driven shaft and has radially secured to it another disk parallel to the rigid disk and carrying a roller which causes sequentially a sector of the toothed ring portion to yield in a direction parallel to the common axis thereby driving the other shaft. The device is housed in a sealed lubricant containing cylindrical box having an integral bottom secured to the frame of the motor and through which passes the motor shaft, the box being closed at the opposite end by the above mentioned rigid disk.

4 Claims, 1 Drawing Sheet

MOTION TRANSMITTING DEVICE BETWEEN TWO COAXIAL ROTATING MEMBERS

This application is a continuation-in-part of application Ser. No. 689,714, filed Jan. 8, 1985, now abandoned.

BACKGROUND OF THE INVENTION

This invention relates to devices for transmitting motion between two coaxial rotating shafts of the type adapted to produce a high motion reducing ratio. For convenience, such devices will hereinafter be referred to as "motion reducing devices."

There are several known motion reducing devices of the type which employ an intermediate disk secured to the driven shaft. This disk has an annular toothed portion engageable in a limited sector with an annular toothed portion of a stationary rigid disk, the teeth of the latter being pitched slightly differently from those of the flexible disk. The engaging sector is continuously changed by action of a member rotating with the driving shaft.

For example, in a motion reducing device for a vehicle window regulator, known from U.S. Pat. No. 3,525,890, the engaging sector of a wobble gear is defined by a plurality of balls rolling in a cam shaped groove of a member rotatable with the rotor of a flat electric motor. The output shaft is sealed with respect to a rigid disk which seals the motor armature, thus preventing adverse affect on the electric motor and the device from exposure to ambient atmosphere. This device has the disadvantage of providing poor torque, due to the flat motor, and of being expensive to manufacture, due to the cam groove and the plurality of balls.

U.S. Pat. No. 3,796,898 discloses a motion reducing device for mechanisms dangerous or not readily accessible including a stationary toothed disk and a flexible toothed disk, the latter secured to the driven shaft. The flexible disk is deformed by a roller carried by a member secured to the motor shaft. However, the device is not protected by any closed structure and cannot be properly lubricated.

Another motion reducing device is known from U.S.S.R. certificate No. 684,226 wherein a wobble gear is engaged by a pair of intermediate friction rings which are carried by an eccentric wave generator and engage two oppositely inclined surfaces of a stationary ring. The joint action of the eccentric motion and the inclined surfaces of the stationary ring causes the intermediate rings to wobble oppositely around the common axis of the two shafts. The wobble disk and the rings are carried by a cylindrical box rotatably mounting the two shafts by means of revolving bearings. This device has the disadvantages of producing high friction between the rings and the inclined surfaces while at the same time making no provision for seals between the box and the two shafts.

SUMMARY OF THE INVENTION

According to the invention, there is provided, in a motion reducing device between a motor shaft adapted to be rotated by an electric motor and a driven shaft coaxial with the motor shaft, wherein the device includes a frame for housing the motor, a stationary rigid disk with an annular portion toothed with a predetermined pitch, a relatively flexible disk secured to the driven shaft provided with an annular portion toothed with a pitch slightly different from the aforementioned predetermined pitch, the flexible disk being located in such a position as to hold its toothed annular portion normally disengaged from the toothed annular portion of the rigid disk, a roller carrying member secured to the motor shaft and carrying at least one roller rotatable on an axis substantially parallel to the plane of the annular portion of the rigid disk to engage the face of the flexible disk opposite its annular portion for causing a sector of the flexible disk to yield in a direction perpendicular to the said plane and to engage a corresponding sector of the annular portion of the rigid disk, the following improvement.

Said device is provided also with a cylindrical box having an integral bottom and an open edge at the opposite end of the bottom, the latter being secured to the frame coaxially with the motor shaft, the rigid disk being so secured to the aforesaid edge as to close the box tightly; the roller carrying member and at least one roller are housed within said box; the flexible disk has an integral hollow portion which is secured to the driven shaft and houses a portion of the motor shaft; the rigid disk is also provided with a cylindrical aperture for rotatably supporting the hollow portion aforesaid and the cylindrical aperture is tightly closed to the hollow portion by a gasket.

In a preferred embodiment, the novel device of the invention device includes first revolving bearings for rotatably mounting the hollow portion within the cylindrical aperture aforesaid, second revolving bearings for rotatably mounting the flexible disk on the support disk, and a set of radial rollers housed in an annular depression of the bottom of the box for rotatably mounting the support disk on such bottom.

In further preferred embodiments, the aforementioned second revolving bearings include a first bearing having axially disposed rollers mounted between the said hub and the said hollow portion and a second bearing having radially disposed rollers mounted between a ring portion of the rigid disk and a portion of the flexible disk, the latter being made of elastic steel and having an annular portion corrugated so as to define concentric waves.

An advantage of the device according to the invention is that of employing an electric motor which is capable of rotating at a high number of revolutions per minute, and which is very light and of small size. Therefore, a driver including such a motor and the motion reducing device of the invention, is very useful for producing the various movements of modern industrial robots, where each arm is moved in various directions to effect specific repeated manipulations.

Still further objects, features and advantages of the invention will become clear from the following detailed description of a preferred embodiment thereof disclosed and described herein by way of example but not in a limiting sense, taken in conjunction with the accompanying drawings.

DETAILED DESCRIPTION OF A PREFERRED EMBODIMENT

Figure 1:
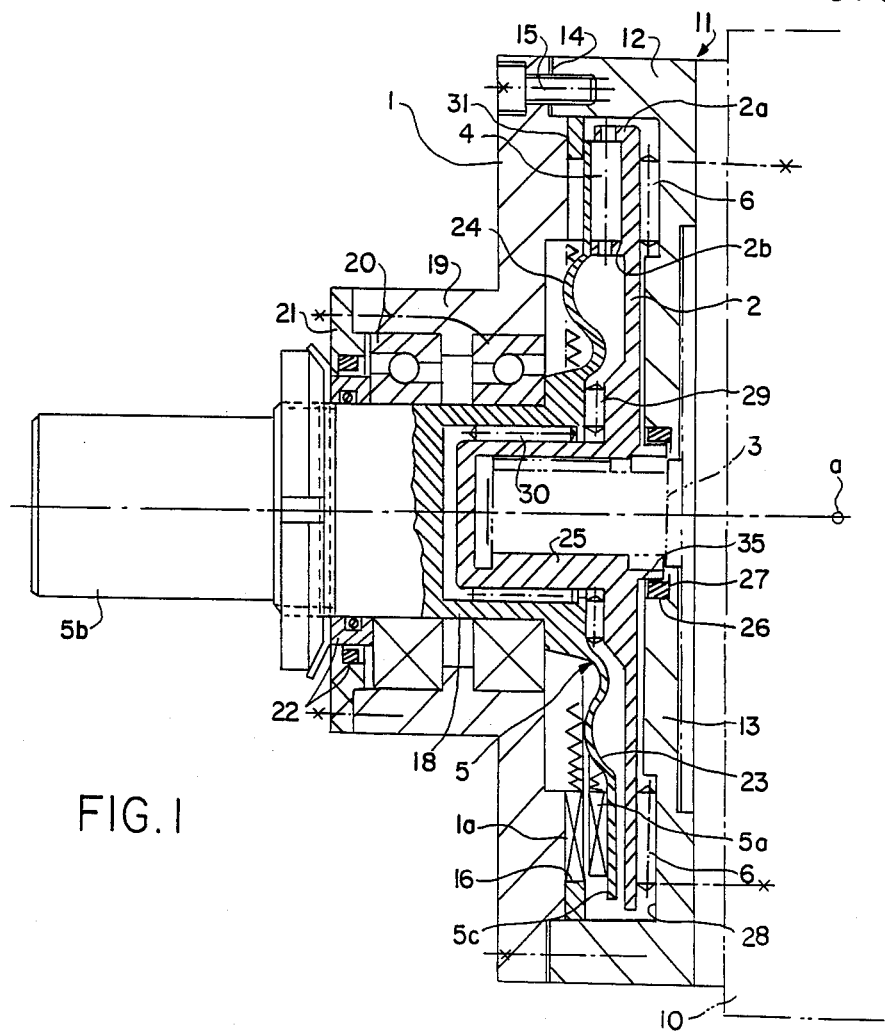
FIG. 1 is a cross-sectional view of a motion reducing device according to the invention.

Referring to FIG. 1, an electric motor and its frame are generally indicated in broken lines and identified by the numeral 10. The electric motor is of known type capable of being selected by persons skilled in the art for desired physical size, RPM and power. The motor includes a driving shaft 3, rotatable on an axis a. The motion reducing device, shown in whole lines, includes a driven shaft 5b rotatable on the same axis, whereby the shaft 5b and the shaft 3 are coaxial.

Secured to the frame of the motor 10 is a cylindrical box 11 having a cylindrical wall 12 and a circular bottom 13. A circular rigid disk 1 is secured to the end edge 14 of the wall 12 by means of a set of machine screws 15. The disk 1 is provided with an inner planar face 16 (FIG. 2) perpendicular to the axis a, having a ring or annular portion in the form of a planar gear 1a, having a number Z2 of teeth distanced in accordance with a predetermined pitch P. Secured to the disk 1 is a spacer ring 31 adapted to be engaged by an outer edge 5c of a toothed member, generally indicated by the numeral 5 (FIG. 1), which includes a hollow cylindrical portion 18 rotatably mounted by means of a pair of ball bearings 20 on a sleeve 19 integral with the rigid disk 1.

A flange 21 and suitable gasket means 22 tightly close the sleeve 19 on the portion 18. This latter is secured to the driven shaft 5b, whereby the rotation of the toothed member 5 is transmitted to the shaft 5b and the box 11 is tightly closed and sealed with respect to the revolving members 5, 5b. The toothed member 5 also includes a flexible disk 23 integral with the free end of the hollow portion 18 and having an annular portion corrugated so as to form at least one wave 24 concentric with the axis a.

The circular ring or annular portion of the disk 23 is in form of a planar gear 5a facing the gear 1a and having a number Z1 of teeth slightly different from the number of Z2 of teeth of the gear 1a, for example Z2=Z1−1.

Therefore, the pitch of the teeth of the geat 5a differs from the pitch P by $$\Delta P = 2\pi \cdot \left( \frac{1}{Z2} - \frac{1}{Z1} \right) \text{rad.}$$

Figure 3:
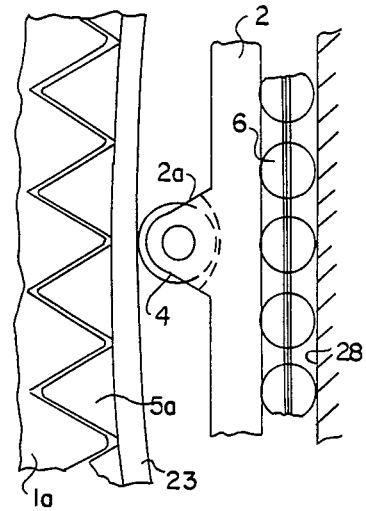
FIG. 3 is circumferential partial view of the detail of FIG. 2 taken along the line III—III thereof.

In the above example $$\Delta P = \frac{2\pi}{Z1(Z1-1)} \text{ rad}$$

and teeth of the gears 1a and 5a have a section in the form of an isosceles triangle (FIG. 3).

Disk 23 (FIG. 1) is made of elastic steel of such thickness as to be easily yieldable in a direction parallel to the axis a.

Particularly at rest, the disk 23 holds the teeth of the gear 5a at a distance from those of the gear 1a, as shown in the lower part of FIG. 1.

Secured to the shaft 3 of the motor to rotate therewith is a hub 25 integral with a support disk 2 parallel to the rigid disk 1. The hub 25 is located within the box 11 and is rotatably mounted within the hollow portion 18 of the member 5 by means of a revolving bearing 30 having rollers whose axes are parallel to axis a. The bottom 13 of box 11 is provided with a circular aperture 26 through which passes shaft 3. The aperture 26 is also partially crossed by a ring portion 35 protruding from the side of the support disk 2 opposite the hub 25. The ring portion 35 is pressed against the interior surface of the aperture 26 by means of a gasket 27. The box 11 can be filled with a lubricating liquid to reduce friction of the moving parts therein.

Figure 2:
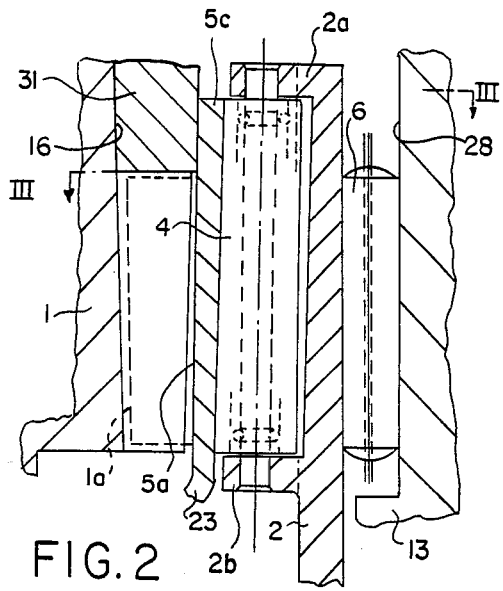
FIG. 2 is a partial view of a detail of the device shown in FIG. 1 on an enlarged scale.

The support disk 2 is provided with a pair of radially aligned projections 2a and 2b rotatably supporting a revolving element comprising a roller 4 (FIGS. 2 and 3). This roller 4 is adapted to engage the face of the flexible disk 23 opposite the gear 5a to cause a limited sector of the gear 5a to yield and to mesh with the gear 1a until the disk 23 is arrested by the ring 31. Since the meshing sector of the two gears 5a and 1a is so limited, the difference of the two pitches is not cumulative and has practically no influence on the correct engagement of the teeth of the two gears 5a and 1a.

As best seen in FIGS. 2 and 3, disk 2 is rotatable with respect to bottom 13 of the box 11 through a revolving roller bearing formed of a set of radial rollers housed in a depression 28 of the inner surface of the bottom 13. The support disk 2 is also rotatable with respect to the flexible disk 23 through another revolving bearing 29 having radially disposed rollers.

The novel motion reducing device of the invention operates as follows.

The motor shaft 3 rotates the disk 2, which causes the roller 4 to revolve on the face of the flexible disk 23 opposite the gear 5a, thus causing continuously the shifting of the sector thereof meshing with the gear 1a. Due to the difference of pitch $\Delta P$, the gear 5a rotates with respect to the stationary gear 1a, so as, after one revolution of the disk 2, the gear 5a and the shaft 5b are rotated an angle $$\Delta P \cdot Z1 = \left( \frac{2\pi}{Z2} - \frac{2\pi}{Z1} \right) \cdot Z1 = 2\pi \left( \frac{Z1}{Z2} - 1 \right) \text{rad.}$$

This rotation occurs in the same direction of rotation as that of the shaft 3 if it is Z1>Z2, whereas if it is Z1<Z2 the shaft 5b is rotated in the direction opposite that of the shaft 3.

The motion reduction ratio is $T = \Delta P \cdot Z1 : 2\pi$, that is $$T = \frac{Z1}{Z2} - 1.$$

In the above case where Z2=Z1−1, it is $$T = \frac{1}{Z2},$$

whereby a very high reduction ratio is easily obtained. In such a device the lost motion between the shafts 3 and 5b is limited to the gap between the engaging surfaces of the teeth of the gears 1a and 5a, since the revolving bearings provide no additional lost motion to the connection.

It should be evident that modifications and addition of parts can be made to the above described preferred embodiment of the novel motion reducing device of the invention without departing from the scope of the invention. For example, the rigid disk 1 could be moved in a controlled way to alter the reduction ratio of the two gears 5a and 1a during the operation. Furthermore, the disk 23, instead of being integral with the hollow cylindrical portion 18, can be made of a separate disk, which could be secured by suitable means to the portion 18. In any case, the disk 23 can be deprived of any corrugating waves 24 and therefore completely flat, while the distancing ring 31 can be removed. Finally, two or more rollers 4 can be provided angularly equidistant on the disk 2, the two gears 5a and 1a having a difference in the number of teeth equal to or a multiple of the number of rollers 4. Obviously, one or more of the roller bearings 6, 29 and 30 can be replaced by ball bearings.

While there has herein been disclosed and described a presently preferred apparatus for practicing the invention, it will nevertheless be understood that the same is by way of illustration and not by way of limitation, and it is intended that the scope of the invention be limited only by the proper interpretation to be afforded the appended claims.

I claim:

1. In a motion reducing device between a motor shaft adapted to be rotated by an electric motor and a driven shaft coaxial with the motor shaft, the said device having: a frame for housing the motor, a stationary rigid disk with an annular portion toothed with a predetermined pitch, a relatively flexible disk secured to the driven shaft provided with a toothed annular portion facing the toothed annular portion of said rigid disk and having a pitch slightly different from the aforementioned predetermined pitch, the flexible disk being located in such a position as to hold its toothed annular portion normally disengaged from the toothed annular portion of the rigid disk, a roller carrying member secured to the motor shaft and carrying at least one roller rotatable on an axis substantially parallel to the plane of the annular portion of the rigid disk to engage the face of the flexible disk opposite its annular portion for causing a sector of the flexible disk to yield in a direction perpendicular to the said plane and to engage a corresponding sector of the annular portion of the rigid disk, the improvement which comprises the provision of:

a cylindrical box having an integral bottom and a cylindrical wall the edge of which defines an opening at the opposite end from said bottom said bottom being secured to said frame coaxially with said motor shaft and being provided with a circular aperture to receive said shaft, said rigid disk being so secured to said edge as to close tightly said opening of said box, said roller carrying member being formed of a support disk parallel to said bottom and including a pair of radially aligned projections for rotatably supporting said at least one roller, said box housing said flexible disk, said support disk and said at least one roller, said flexible disk having a hollow portion integral therewith and secured to said driven shaft, said support disk including a hub portion secured to said motor shaft and housed within said hollow portion and a ring portion protruding from the opposite side with respect to said hub and crossing said circular aperture of said bottom, first gasket means for tightly sealing said ring portion to the periphery of said circular aperture, said rigid disk having a cylindrical aperture for rotatably supporting said hollow portion, and second gasket means tightly closing said cylindrical aperture of said hollow portion of said flexible disk, said box being filled with a liquid lubricant.

2. A device according to claim 1, including first revolving bearings for rotatably mounting said hollow portion within said cylindrical aperture, second revolving bearings for rotatably mounting said flexible disk on said support disk, and a set of radial rollers housed in an annular depression of said bottom for rotatably mounting said support disk on said bottom.

3. A device according to claim 2, wherein said second revolving bearings include a first bearing having axially disposed rollers mounted between said hub and said hollow portion and a second bearing having radially disposed rollers mounted between a ring portion of said rigid disk and a portion of said flexible disk.

4. A device according to claim 1, wherein said flexible disk is made of elastic steel and includes an annular portion corrugated so as to define concentric waves.

* * * * *

UNITED STATES PATENT AND TRADEMARK OFFICE
CERTIFICATE OF CORRECTION

PATENT NO. : 4,742,729
DATED : May 10, 1988
INVENTOR(S) : Oscar Cordara

It is certified that error appears in the above-identified patent and that said Letters Patent are hereby corrected as shown below:

Foreign Application Priority Data, "Jan. 8, 1985 [EP] European Pat. Off. 85730001.6" and "Jan. 10, 1985 [JP] Japan 60-2601" should be deleted.

Col. 3 line 41, "geat" should be -- gear --

Signed and Sealed this

Thirtieth Day of August, 1988

Attest:

DONALD J. QUIGG

Attesting Officer

Commissioner of Patents and Trademarks